US011465767B2

(12) United States Patent
Matsuda et al.

(10) Patent No.: US 11,465,767 B2
(45) Date of Patent: Oct. 11, 2022

(54) ELECTRIC POWER GENERATION CONTROLLER FOR USE IN AIRCRAFT AND ELECTRIC POWER GENERATING APPARATUS INCLUDING SAME

(71) Applicant: KAWASAKI JUKOGYO KABUSHIKI KAISHA, Kobe (JP)

(72) Inventors: Kippei Matsuda, Kobe (JP); Hideyuki Imai, Kobe (JP); Kenichiro Tanaka, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 17/294,003

(22) PCT Filed: Nov. 19, 2018

(86) PCT No.: PCT/JP2018/042643
§ 371 (c)(1),
(2) Date: May 14, 2021

(87) PCT Pub. No.: WO2020/105083
PCT Pub. Date: May 28, 2020

(65) Prior Publication Data
US 2022/0017231 A1    Jan. 20, 2022

(51) Int. Cl.
*F16D 48/06*    (2006.01)
*B64D 35/02*    (2006.01)
(Continued)

(52) U.S. Cl.
CPC ............ *B64D 35/02* (2013.01); *B64D 27/24* (2013.01); *B64D 31/04* (2013.01); *F16D 48/06* (2013.01);
(Continued)

(58) Field of Classification Search
None
See application file for complete search history.

(56) References Cited

U.S. PATENT DOCUMENTS

2001/0003108 A1    6/2001    Goi et al.
2006/0128525 A1*   6/2006    Zenno .................. F16D 48/064
                                                    477/115
(Continued)

FOREIGN PATENT DOCUMENTS

JP    60-190142 A    9/1985
JP    2001-158400 A   6/2001

*Primary Examiner* — Timothy Hannon

(57) ABSTRACT

An electric power generation controller for use in an aircraft is a controller of an electric power generating apparatus including a manual transmission configured to change speed of rotational power of an aircraft engine, transmit the rotational power to an electric power generator, and switch a gear stage by a friction clutch pressed by an actuator. The electric power generation controller includes a manual transmission control section configured to control the manual transmission. The manual transmission control section includes: a shift command section configured to output a shift signal which switches the gear stage of the manual transmission; and a clutch control section configured to, when switching the gear stage of the manual transmission, control clutch pressure of the actuator such that the friction clutch becomes a half-engaged state.

5 Claims, 5 Drawing Sheets

(51) Int. Cl.
*B64D 27/24* (2006.01)
*B64D 31/04* (2006.01)
*F16H 37/02* (2006.01)

(52) U.S. Cl.
CPC ......... *F16D 48/066* (2013.01); *F16H 37/021* (2013.01); *F16D 2500/1045* (2013.01); *F16D 2500/1082* (2013.01); *F16D 2500/1087* (2013.01); *F16D 2500/1088* (2013.01); *F16D 2500/10406* (2013.01); *F16D 2500/10412* (2013.01); *F16D 2500/3067* (2013.01); *F16D 2500/30816* (2013.01); *F16D 2500/30825* (2013.01); *F16D 2500/70406* (2013.01); *F16H 2702/00* (2013.01)

(56) References Cited

U.S. PATENT DOCUMENTS

| | | |
|---|---|---|
| 2008/0200299 A1 | 8/2008 | Russ |
| 2014/0309077 A1 | 10/2014 | Heglund et al. |
| 2018/0118190 A1* | 5/2018 | Ruybal .................. F16H 61/46 |

* cited by examiner

ELECTRIC POWER GENERATION CONTROLLER FOR USE IN AIRCRAFT AND ELECTRIC POWER GENERATING APPARATUS INCLUDING SAME

CROSS REFERENCE TO RELATED APPLICATIONS

This application is a National Stage of International Application No. PCT/W2018/042643 filed Nov. 19, 2018.

TECHNICAL FIELD

The present invention relates to a controller of an electric power generating apparatus including a manual transmission configured to change speed of rotational power of an aircraft engine, transmit the rotational power to an electric power generator, and switch a gear stage by a friction clutch pressed by an actuator.

BACKGROUND ART

Many of aircrafts include, as main power supplies, electric power generating apparatuses driven by flight engines. One example of such electric power generating apparatuses is a drive mechanism-integrated electric power generating apparatus (Integrated Drive Generator; IDG). This electric power generating apparatus integrally includes an electric power generator and a continuously variable transmission arranged upstream of the electric power generator (see PTL 1, for example).

CITATION LIST

Patent Literature

PTL 1: Japanese Laid-Open Patent Application Publication No. 2001-158400

SUMMARY OF INVENTION

Technical Problem

A case where large rotational frequency fluctuation of power taken out from an engine occurs is assumed, and it is necessary to consider a configuration capable of, even when a rotational frequency fluctuation range of the power becomes large, adjusting a rotational frequency of the power to an appropriate rotational frequency and transmitting the power to the electric power generator. As a countermeasure against this, if a speed change range of a continuously variable transmission of the electric power generating apparatus is made large, the continuously variable transmission needs to be increased in diameter, and the entire apparatus is increased in size, which is not preferable. As a countermeasure which deals with the large rotational frequency fluctuation while preventing the electric power generating apparatus from increasing in size, one idea is that: a small manual transmission (for example, two-stage manual transmission) is provided upstream of the electric power generating apparatus; and the rotational frequency fluctuation range of the power input to the electric power generating apparatus is narrowed by a speed change operation of the manual transmission.

However, according to the manual transmission, an output rotational frequency momentarily and suddenly decreases at the time of shift-up, and the output rotational frequency momentarily and suddenly increases at the time of shift-down. When the output rotational frequency of the manual transmission gently changes, a continuously variable transmission provided downstream of the manual transmission performs a speed change operation, and with this, the rotational frequency input to the electric power generator is adjusted to an appropriate range. However, when the output rotational frequency of the manual transmission momentarily and suddenly changes beyond a response ability of the continuously variable transmission, the rotational frequency of the power input to the electric power generating apparatus momentarily and largely fluctuates, and an electric power generation frequency becomes unstable.

An object of the present invention is to provide a controller of an electric power generating apparatus including a manual transmission provided upstream of an electric power generator, the controller being configured to prevent momentary rotational frequency fluctuation of power input to the electric power generator and stabilize electric power generation.

Solution to Problem

An electric power generation controller for use in an aircraft according to one aspect of the present invention is a controller of an electric power generating apparatus including a manual transmission configured to change speed of rotational power of an aircraft engine, transmit the rotational power to an electric power generator, and switch a gear stage by a friction clutch pressed by an actuator. The electric power generation controller includes a manual transmission control section configured to control the manual transmission. The manual transmission control section includes a shift command section configured to output a shift signal which switches the gear stage of the manual transmission and a clutch control section configured to, when switching the gear stage of the manual transmission, control clutch pressure of the actuator such that the friction clutch becomes a half-engaged state.

According to the above configuration, when switching a speed change position of the manual transmission between a first gear stage at which the friction clutch is in an engaged state and a second gear stage at which the friction clutch is in a disengaged state, the friction clutch once becomes the half-engaged state, and then, the speed change is performed. Therefore, an output rotational frequency of the manual transmission can be changed gently. On this account, in the electric power generating apparatus including the manual transmission provided upstream of the electric power generator, momentary rotational frequency fluctuation of the power input to the electric power generator can be prevented, and electric power generation can be stabilized.

The manual transmission control section may further include an electric power generation load receiving section configured to receive an electric power generation load of the electric power generator. When the friction clutch is in the half-engaged state, the clutch control section may control the actuator such that clutch pressure of the friction clutch increases as the electric power generation load increases.

According to the above configuration, even when the output rotational frequency of the manual transmission at the time of the speed change changes in accordance with the electric power generation load since output torque of the manual transmission changes at the time of the speed change of the manual transmission, a change in the output rotational frequency of the manual transmission at the time of the speed change can be accurately controlled by controlling the clutch pressure with reference to the electric power generation load.

The electric power generation controller may further include a rotational frequency receiving section configured to receive an output-side rotational frequency of the manual transmission. When the friction clutch is in the half-engaged state, the clutch control section controls the actuator such that clutch pressure of the friction clutch increases as the output-side rotational frequency of the manual transmission decreases.

According to the above configuration, the change in the output rotational frequency of the manual transmission at the time of the speed change can be accurately controlled by controlling the clutch pressure with reference to the output rotational frequency of the manual transmission at the time of the speed change of the manual transmission.

A continuously variable transmission may be interposed on a power transmission path between the manual transmission and the electric power generator. The electric power generation controller may further include a continuously variable transmission control section configured to control the continuously variable transmission based on an input rotational frequency of the continuously variable transmission such that the rotational frequency input to the electric power generator becomes constant.

According to the above configuration, even when a rotational frequency fluctuation range of the power taken out from the engine is large, the rotational frequency fluctuation range can be narrowed by the combination of the manual transmission and the continuously variable transmission, and the rotational frequency input to the electric power generator can be maintained constant.

When the friction clutch is in a first state that is one of an engaged state or a disengaged state, the manual transmission may be set to a first gear stage. When the friction clutch is in a second state that is the other of the engaged state and the disengaged state, the manual transmission may be set to a second gear stage. The shift signal may be a shift-up signal which increases a change gear ratio or a shift-down signal which decreases the change gear ratio. When switching the gear stage of the manual transmission such that the change gear ratio decreases, the clutch control section may control the clutch pressure of the actuator such that the friction clutch becomes the half-engaged state, and then, control the clutch pressure of the actuator such that the friction clutch becomes the first state. When switching the gear stage of the manual transmission such that the change gear ratio increases, the clutch control section may control the clutch pressure of the actuator such that the friction clutch becomes the half-engaged state, and then, control the clutch pressure of the actuator such that the friction clutch becomes the second state.

According to the above configuration, when the manual transmission performs shift-up or shift-down, the friction clutch once becomes the half-engaged state, and then, the speed change is performed. Therefore, the output rotational frequency of the manual transmission can be changed gently.

An electric power generating apparatus for use in an aircraft according to another aspect of the present invention includes: the above-described electric power generation controller; a manual transmission configured to change speed of rotational power of an aircraft engine and including a plurality of gear stages; and an electric power generator configured to transmit power which has been changed in speed by the manual transmission.

According to the above configuration, the rotational frequency of the power input to the electric power generator can be prevented from momentarily changing due to the speed change of the manual transmission, and the electric power generation can be stabilized.

Advantageous Effects of Invention

According to the present invention, in the electric power generating apparatus including the manual transmission provided upstream of the electric power generator, the momentary rotational frequency fluctuation of the power input to the electric power generator can be prevented, and the electric power generation can be stabilized.

DESCRIPTION OF EMBODIMENTS

Hereinafter, an embodiment will be described with reference to the drawings.

Figure 1:
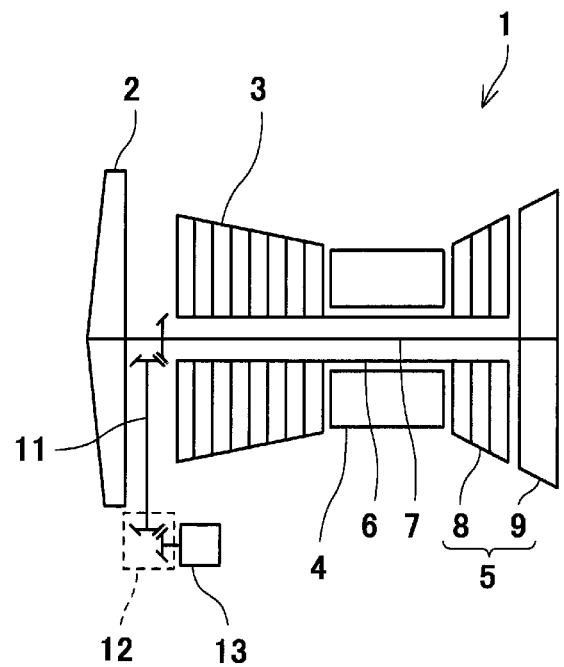
FIG. 1 is a schematic diagram showing an aircraft engine and an electric power generating apparatus according to an embodiment.

FIG. 1 is a schematic diagram showing an aircraft engine 1 and an electric power generating apparatus 13 according to the embodiment. As shown in FIG. 1, the aircraft engine 1 is a two-shaft gas turbine engine and includes a fan 2, a compressor 3, a combustor 4, a turbine 5, a high-pressure shaft 6, and a low-pressure shaft 7. The fan 2 is arranged at a front portion of the aircraft engine 1 and is surrounded by a fan casing. The turbine 5 includes a high-pressure turbine 8 at a front stage side and a low-pressure turbine 9 at a rear stage side. The high-pressure turbine 8 is coupled to the compressor 3 through the high-pressure shaft 6. The high-pressure shaft 6 is a tubular shaft body including therein a hollow space. The low-pressure turbine 9 is coupled to the fan 2 through the low-pressure shaft 7. The low-pressure shaft 7 is inserted into the hollow space of the high-pressure shaft 6.

A connecting shaft 11 extending outward in a radial direction is connected to the low-pressure shaft 7 such that the low-pressure shaft 7 can transmit power to the connecting shaft 11. A gear box 12 is connected to the connecting shaft 11 such that the connecting shaft 11 can transmit the power to the gear box 12. The electric power generating apparatus 13 is connected to the gear box 12 such that the gear box 12 can transmit the power to the electric power generating apparatus 13. To be specific, rotational power of the low-pressure shaft 7 is transmitted through the connecting shaft 11 and the gear box 12 to the electric power generating apparatus 13. Since rotational frequency fluctuation of the low-pressure shaft 7 is larger than rotational frequency fluctuation of the high-pressure shaft 6, a rotational frequency fluctuation range of the power input to the electric power generating apparatus 13 becomes large. It should be noted that the power to be transmitted to the electric power generating apparatus 13 may be taken out from the high-pressure shaft 6 instead of the low-pressure shaft 7.

Figure 2:
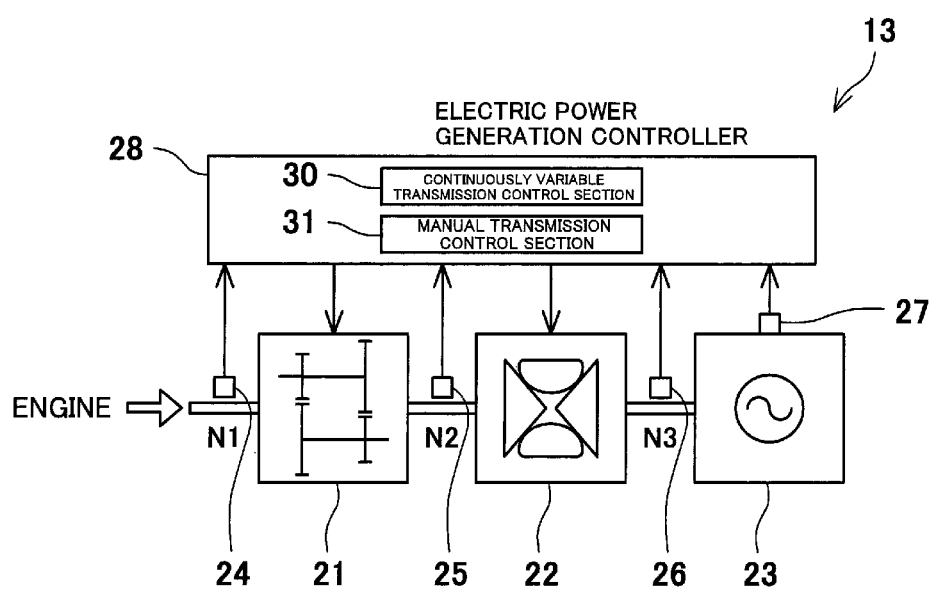
FIG. 2 is a block diagram showing the electric power generating apparatus shown in FIG. 1.

FIG. 2 is a block diagram showing the electric power generating apparatus 13 shown in FIG. 1. As shown in FIG. 2, the electric power generating apparatus 13 includes a manual transmission 21, a continuously variable transmission 22, an electric power generator 23, and an electric power generation controller 28. The electric power generating apparatus 13 includes first to third rotational frequency sensors 24 to 26 and a load sensor 27 as sensors. The rotational power taken out from the low-pressure shaft 7 of the aircraft engine 1 is changed in speed by the manual transmission 21 and the continuously variable transmission 22 and is then input to the electric power generator 23, and electric power generated by the electric power generator 23 is supplied to an electrical apparatus (not shown) of the aircraft. To be specific, a case where large rotational frequency fluctuation of the power taken out from the engine 1 occurs is assumed, and a rotational frequency of the power is adjusted by the manual transmission 21 and the continuously variable transmission 22 such that the rotational frequency of the power input to the electric power generator 23 stabilizes.

The rotational power taken out from the aircraft engine 1 is input to the manual transmission 21. The manual transmission 21 is a transmission configured to select a gear train, by which the power is transmitted, from a plurality of gear trains and perform speed change. When switching the gear train by which the power is transmitted, an output rotational frequency of the manual transmission 21 fluctuates. In the present embodiment, as one example, the manual transmission 21 is of a two-stage speed change type, and the rotational frequency of the manual transmission 21 fluctuates. In the present embodiment, as one example, the manual transmission 21 is of a two-stage speed change type and includes a lower stage (equal speed stage) and an upper stage (speed increasing stage) having a larger speed increase ratio (smaller reduction ratio) than the lower stage. When performing shift-up from the lower stage to the upper stage or performing shift-down from the upper stage to the lower stage, the manual transmission 21 changes from a state where one gear train is being selected to a state where another gear train is being selected through a disengaged state (neutral state). It should be noted that the present embodiment has described a case where the manual transmission 21 includes only two gear stages. However, the number of gear stages may be more than two.

The rotational power which has been changed in speed by and output from the manual transmission 21 is input to the continuously variable transmission 22. For example, a toroidal continuously variable transmission can be used as the continuously variable transmission 22. The toroidal continuously variable transmission changes the change gear ratio in such a manner that a power roller sandwiched by input and output discs is tilted by changing the position of the power roller by an actuator. Since the toroidal continuously variable transmission is publicly known, the explanation of a detailed structure thereof is omitted. It should be noted that the continuously variable transmission may be of a different type, and for example, may be a hydraulic transmission (Hydro Static Transmission).

The rotational power which has been changed in speed by and output from the continuously variable transmission 22 is input to the electric power generator 23. The electric power generator 23 is an AC generator. When the power having a constant rotational frequency is input to the electric power generator 23, the electric power generator 23 generates alternating current having a constant frequency. The first rotational frequency sensor 24 detects an input rotational frequency N1 of the manual transmission 21. The second rotational frequency sensor 25 detects an output rotational frequency N2 of the manual transmission 21 (i.e., an input rotational frequency of the continuously variable transmission 22). The third rotational frequency sensor 26 detects an output rotational frequency N3 of the continuously variable transmission 22. The load sensor 27 detects a load of the electric power generator 23. For example, a sensor configured to detect current and voltage of the electric power generator 23 may be used as the load sensor 27. It should be noted that a gear may be interposed between the manual transmission 21 and the continuously variable transmission 22, and the output rotational frequency N2 of the manual transmission 21 does not have to coincide with the input rotational frequency of the continuously variable transmission 22.

The electric power generation controller 28 includes a continuously variable transmission control section 30 and a manual transmission control section 31. The continuously variable transmission control section 30 refers to the rotational frequencies N2 and N3 detected by the second and third rotational frequency sensors 25 and 26 and controls the speed change operation of the continuously variable transmission 22 such that the rotational frequency N3 input to the electric power generator 23 becomes constant. The manual transmission control section 31 refers to the rotational frequency N1 detected by the first rotational frequency sensor 24 (or the rotational frequency N2 detected by the second rotational frequency sensor 25) and controls the speed change operation of the manual transmission 21 such that the band of the rotational frequency input to the continuously variable transmission 22 narrows.

Figure 3:
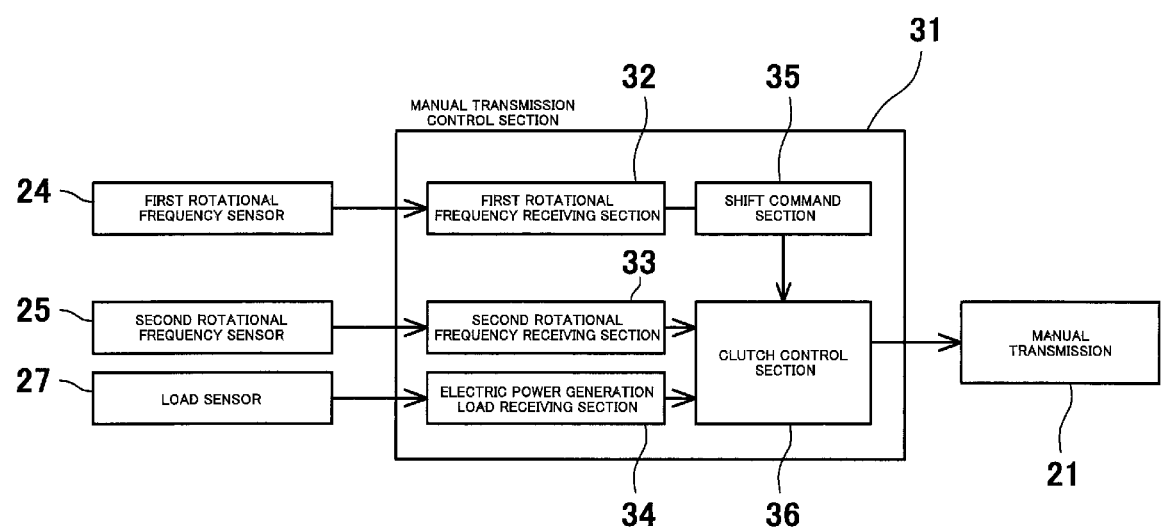
FIG. 3 is a block diagram showing a manual transmission control section of an electric power generation controller shown in FIG. 2.

FIG. 3 is a block diagram showing the manual transmission control section 31 of the electric power generation controller 28 shown in FIG. 2. As shown in FIG. 3, the manual transmission control section 31 is realized by a processor, a volatile memory, a non-volatile memory, an I/O interface, and the like of the electric power generation controller 28 in terms of hardware. The electric power generation controller 28 includes a first rotational frequency receiving section 32, a second rotational frequency receiving section 33, an electric power generation load receiving section 34, a shift command section 35, and a clutch control section 36 in terms of function. These receiving sections 32 to 34 are realized by the I/O interface. Each of the shift command section 35 and the clutch control section 36 is realized in such a manner that the processor performs calculation processing by using the volatile memory based on a program stored in the non-volatile memory.

The first rotational frequency receiving section 32 receives the input rotational frequency N1 of the manual transmission 21 from the first rotational frequency sensor 24. The second rotational frequency receiving section 33 receives the output rotational frequency N2 of the manual transmission 21 from the second rotational frequency sensor 25. The electric power generation load receiving section 34 receives the load of the electric power generator 23 from the load sensor 27. When a predetermined shift condition is satisfied, the shift command section 35 outputs a shift signal which switches the gear stage of the manual transmission 21. The shift condition may be a shift-down condition or a shift-up condition.

Specifically, when the predetermined shift-down condition is satisfied, the shift command section 35 outputs a shift-down signal. Moreover, when the predetermined shift-up condition is satisfied, the shift command section 35 outputs a shift-up signal. When the shift condition is satisfied, the clutch control section 36 controls clutch pressure of a piston 62 (actuator) configured to apply press-contact force to a friction clutch 61 (see FIG. 4) of a below-described brake 56 in the manual transmission 21 such that the friction clutch 61 becomes a half-engaged state. It should be noted that the clutch control section 36 may start controlling the clutch pressure, which sets the friction clutch 61 (see FIG. 4) to the half-engaged state, before the output of the shift signal, simultaneously with the output of the shift signal, or after the output of the shift signal.

Figure 4:
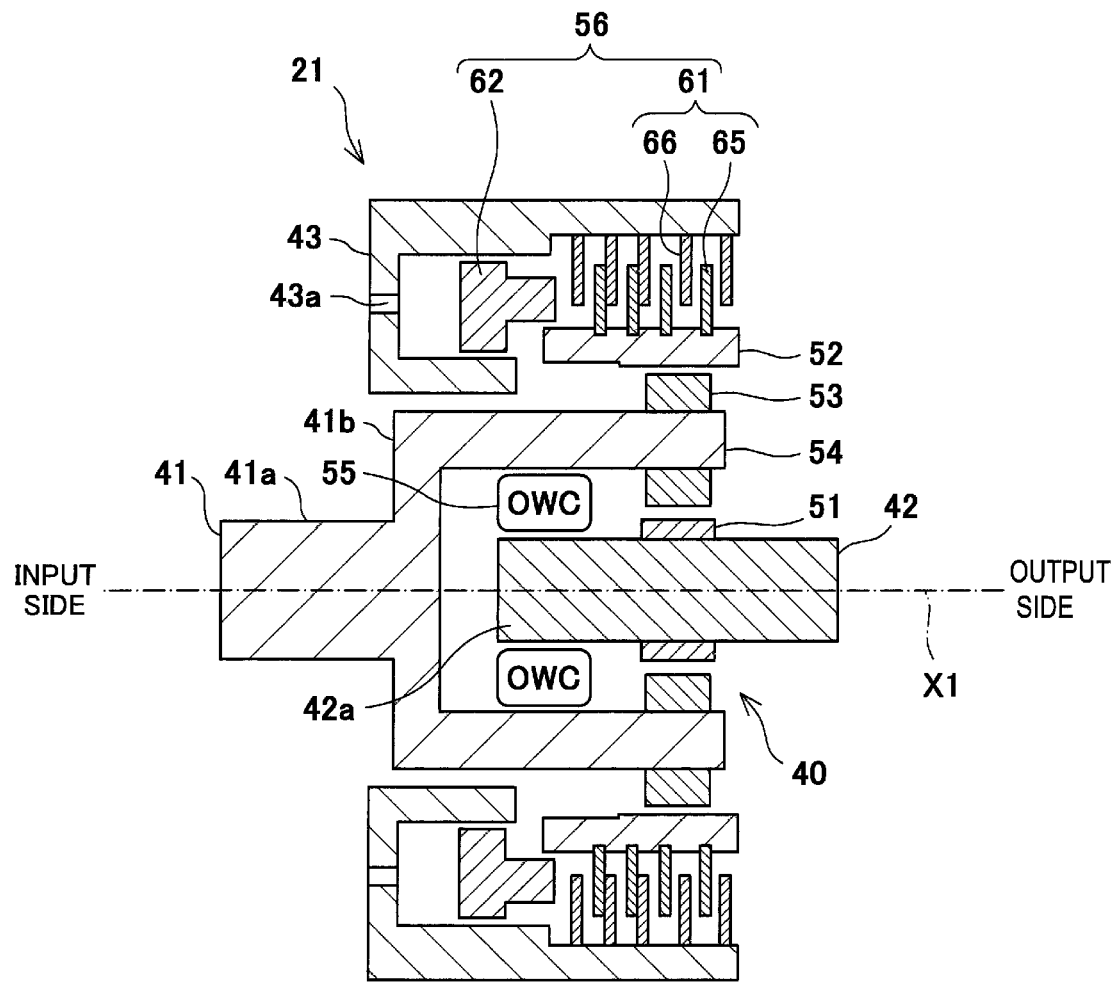
FIG. 4 is a sectional view showing a manual transmission shown in FIG. 2.

FIG. 4 is a sectional view showing the manual transmission 21 shown in FIG. 2. As shown in FIG. 4, the manual transmission 21 is configured to switch between a low-speed stage and a high-speed stage by the brake 56 including the friction clutch 61. The specific configuration of the manual transmission 21 is not especially limited as long as the manual transmission 21 switches the gear stage by the friction clutch 61 capable of continuously changing the magnitude of transmitting power by using the half-engaged state. As one example, the present embodiment describes the manual transmission 21 including a planetary gear mechanism 40, an input shaft 41, an output shaft 42, and a casing 43.

The planetary gear mechanism 40 includes a sun gear 51, a ring gear 52, a planetary gear 53, a carrier 54, a one-way clutch 55, and the brake 56. The input shaft 41 is connected to the carrier 54 holding the planetary gear 53 of the planetary gear mechanism 40. The output shaft 42 is connected to the sun gear 51 of the planetary gear mechanism 40. The brake 56 supported by the casing 43 is connected to the ring gear 52. Both of the input shaft 41 and the output shaft 42 are arranged on an axis X1.

The input shaft 41 includes: a first shaft portion 41a projecting from the casing 43 toward an input side; and a second shaft portion 41b accommodated in the casing 43. The second shaft portion 41b is connected to the carrier 54. The second shaft portion 41b is tubular and includes an internal space that is open toward the output shaft 42.

The output shaft 42 includes a tip end portion 42a inserted into the internal space of the tubular second shaft portion 41b. The tip end portion 42a of the output shaft 42 is supported by the second shaft portion 41b of the input shaft 41 through a bearing (not shown) such that the output shaft 42 is rotatable. The sun gear 51 is connected to a portion of the output shaft 42 which portion is located at an output side of the tip end portion 42a (i.e., located downstream of the tip end portion 42a).

The one-way clutch 55 is sandwiched between the input shaft 41 and the output shaft 42. Specifically, the one-way clutch 55 is annular and is sandwiched between an inner peripheral surface of the second shaft portion 41b of the input shaft 41 and an outer peripheral surface of the tip end portion 42a of the output shaft 42. The one-way clutch 55 transmits power only in one rotational direction and does not transmit the power in an opposite rotational direction. The one-way clutch 55 transmits rotational power from the input shaft 41 to the output shaft 42 but does not transmit the rotational power from the output shaft 42 to the input shaft 41.

The ring gear 52 includes internal teeth which mesh with the planetary gear 53. The brake 56 is connected to an outer peripheral surface of the ring gear 52 while being supported by the casing 43. The brake 56 operates between an operating state in which the ring gear 52 is fixed to the casing 43 and a non-operating state in which the ring gear 52 is rotatable relative to the casing 43. Specifically, the brake 56 includes the friction clutch 61 and the piston 62 (actuator) configured to apply the press-contact force to the friction clutch 61.

The friction clutch 61 is interposed between an inner peripheral surface of the casing 43 and the outer peripheral surface of the ring gear 52. The friction clutch 61 is, for example, a multiple disc clutch. Specifically, the friction clutch 61 includes a friction plate 65 and a mating plate 66. The friction plate 65 is connected to the ring gear 52 so as to be unrotatable relative to the ring gear 52 and movable relative to the ring gear 52 in a direction along the axis X1. The mating plate 66 is connected to the casing 43 so as to be unrotatable relative to the casing 43 and movable relative to the casing 43 in the direction along the axis X1.

The piston 62 is opposed to the friction clutch 61. The piston 62 is supported by the casing 43 so as to be slidable. The casing 43 includes a hydraulic pressure passage 43a through which hydraulic pressure is applied to the piston 62. Pressure oil is supplied to the hydraulic pressure passage 43b by a hydraulic pump (not shown) driven by the power of the aircraft engine 1.

Since the pressure oil supplied from the hydraulic pressure passage 43a pushes the piston 62, the piston 62 presses the friction clutch 61, and the friction clutch 61 becomes an engaged state (the operating state of the brake 56). When the hydraulic pressure applied from the hydraulic circuit 43a to the piston 62 decreases, and the piston 62 retreats, the friction clutch 61 becomes a disengaged state (the non-operating state of the brake 56). It should be noted that the actuator configured to press the friction clutch 61 is not limited to a hydraulic actuator, such as the piston 62, and may be a different actuator (for example, an electromagnetic actuator).

Figure 5A:
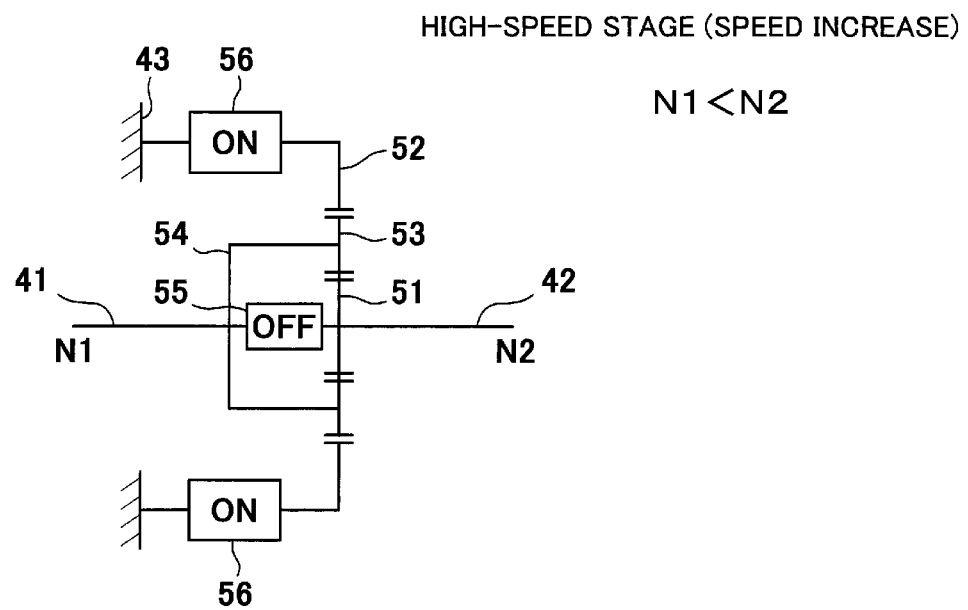
FIGS. 5A and 5B are schematic diagrams for explaining an operation principle of the manual transmission shown in FIG. 4.
Figure 5B:
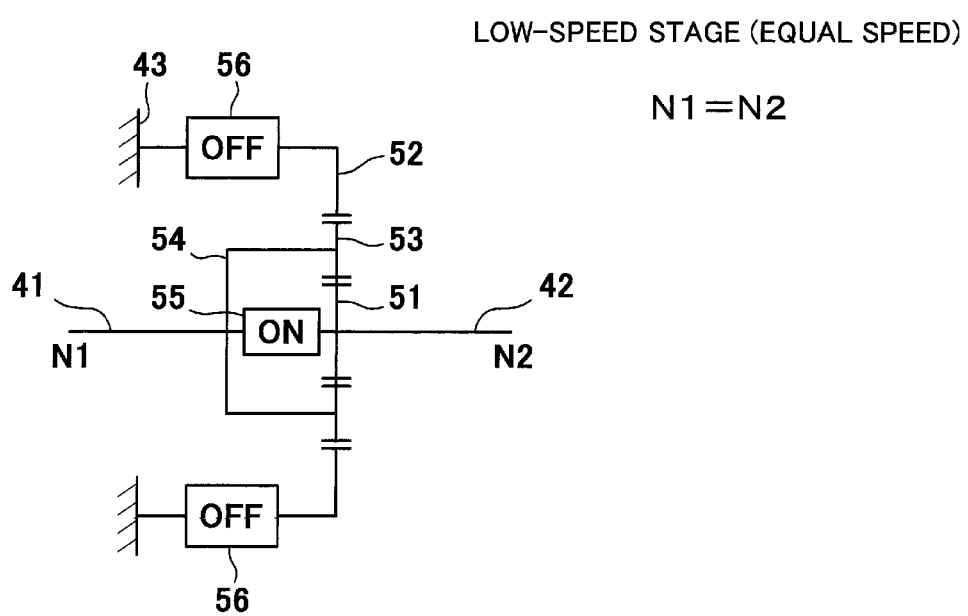

FIGS. 5A and 5B are schematic diagrams for explaining an operation principle of the manual transmission 21 shown in FIG. 4. As shown in FIG. 5A, in the manual transmission 21, when the brake 56 becomes the operating state, the ring gear 52 is fixed to the casing 43, and the rotational power of the input shaft 41 is transmitted to the output shaft 42 through the carrier 54, the planetary gear 53, and the sun gear 51. Thus, speed increase is performed (N1<N2). On the other hand, as shown in FIG. 5B, in the manual transmission 21, when the brake 56 becomes the non-operating state, the ring gear 52 is rotatable relative to the casing 43, and the rotational power of the input shaft 41 is transmitted to the output shaft 42 through the one-way clutch 55 at equal speed (N1=N2).

To be specific, when the brake 56 becomes the operating state, the manual transmission 21 is set to the high-speed stage (speed increase). When the brake 56 becomes the non-operating state, the manual transmission 21 is set to the low-speed stage (equal speed). It should be noted that the combination of two gear stages (the high-speed stage and the low-speed stage) of the manual transmission 21 does not have to be the combination of the speed increasing stage and the equal speed stage and may be, for example, the combination of the speed increasing stage and a speed decreasing stage or the combination of the equal speed stage and the speed decreasing stage.

Figure 6:
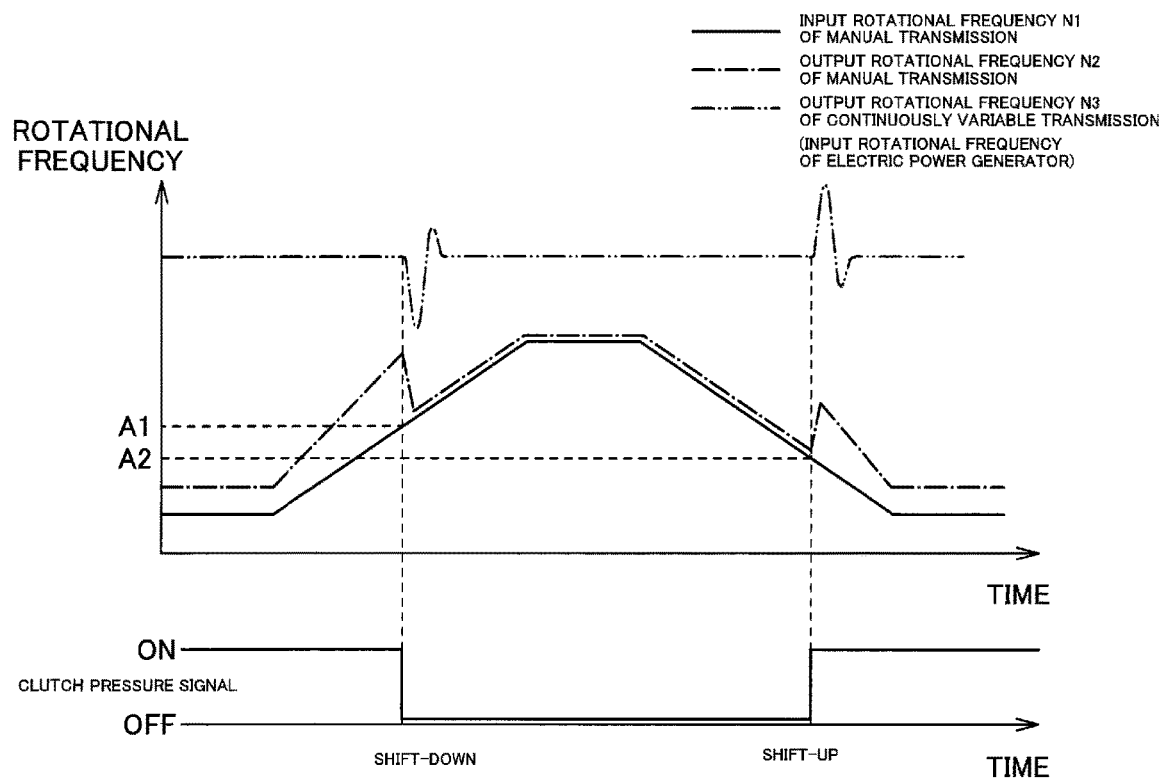
FIG. 6 is a graph showing a relationship among an input rotational frequency and an output rotational frequency of the manual transmission and an output rotational frequency of a continuously variable transmission in Comparative Example.
Figure 7:
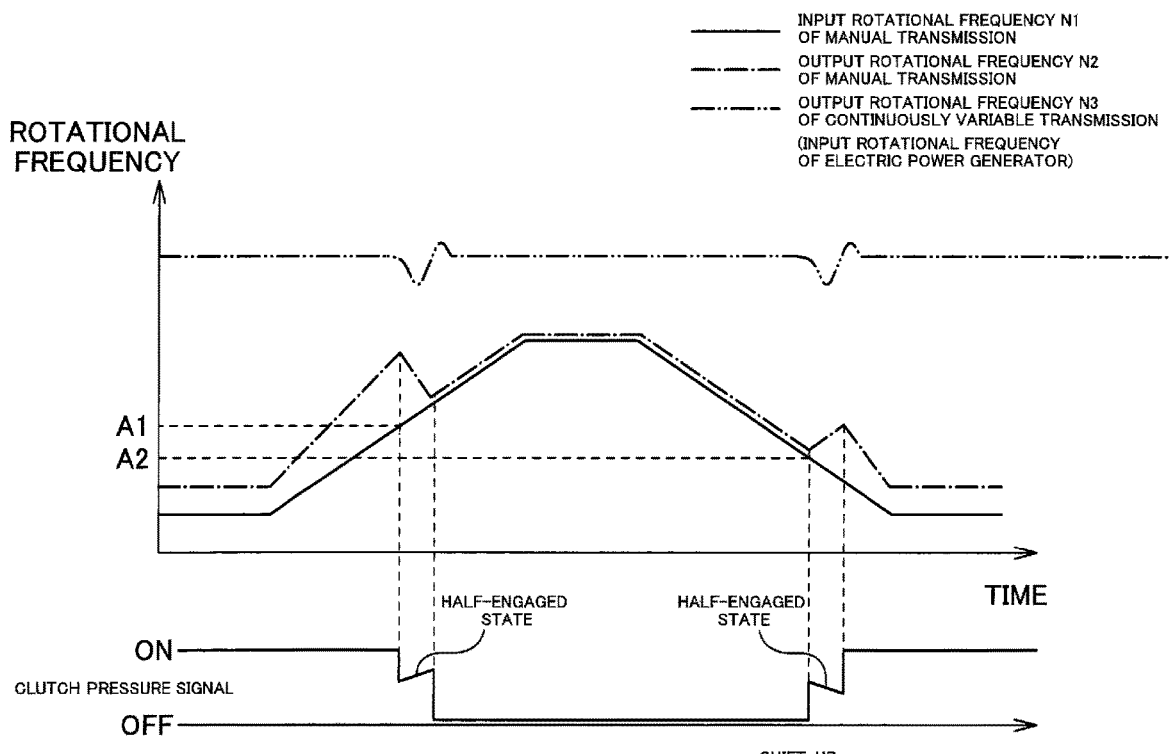
FIG. 7 is a graph showing a relationship among the input rotational frequency and the output rotational frequency of the manual transmission shown in FIG. 2 and the output rotational frequency of the continuously variable transmission shown in FIG. 2.

FIG. 6 is a graph showing a relationship among the input rotational frequency and the output rotational frequency of the manual transmission and the output rotational frequency of the continuously variable transmission in Comparative Example. FIG. 7 is a graph showing a relationship among the input rotational frequency and the output rotational frequency of the manual transmission 21 shown in FIG. 2 and the output rotational frequency of the continuously variable transmission shown in FIG. 2. It should be noted that each of FIGS. 6 and 7 shows an example of two-stage speed change in which the lower stage (low-speed stage) corresponds to equal speed, and the upper stage (high-speed stage) corresponds to speed increase. However, the present embodiment is not limited to this as long as the change gear ratio of the upper stage is larger than that of the lower stage (the reduction ratio of the upper stage is smaller than that of the lower stage).

In Comparative Example shown in FIG. 6, when the shift-down condition in which the input rotational frequency of the manual transmission 21 exceeds the first threshold A1 is satisfied, the shift-down signal is output, and the manual transmission 21 is changed from the high-speed stage to the low-speed stage. Therefore, the output rotational frequency of the manual transmission 21 suddenly changes to a decrease side, and the output rotational frequency of the continuously variable transmission 22 mainly and suddenly changes to the decrease side. Moreover, when the shift-up condition in which the input rotational frequency of the manual transmission 21 falls below a second threshold A2 is satisfied, the shift-up signal is output, and the manual transmission 21 is changed from the high-speed stage to the low-speed stage. Therefore, the output rotational frequency of the manual transmission 21 suddenly changes to an increase side, and the output rotational frequency of the continuously variable transmission 22 mainly and suddenly changes to the increase side.

On the other hand, in the example of the present embodiment shown in FIG. 7, when the shift-down condition in which the input rotational frequency of the manual transmission 21 exceeds the first threshold A1 is satisfied, the shift command section 35 outputs the shift-down signal to the clutch control section 36 (see FIG. 3). When the shift-down signal is output, the clutch control section 36 controls the clutch pressure of the piston 62 such that the friction clutch 61 (see FIG. 4) becomes the half-engaged state. Then, the clutch control section 36 controls the clutch pressure of the piston 62 such that the friction clutch 61 becomes the disengaged state.

When the shift-up condition in which the input rotational frequency of the manual transmission 21 falls below the second threshold A2 is satisfied, the shift command section 35 outputs the shift-up signal to the clutch control section 36 (see FIG. 3). When the shift-up signal is output, the clutch control section 36 controls the clutch pressure of the piston 62 such that the friction clutch 61 (see FIG. 4) becomes the half-engaged state. Then, the clutch control section 36 controls the clutch pressure of the piston 62 such that the friction clutch 61 becomes the engaged state. Therefore, the amount of change of the output rotational frequency of the continuously variable transmission 22 to the increase side is suppressed. It should be noted that a period of time in which the friction clutch 61 is maintained in the half-engaged state may be set in advance.

When the shift signal is output, the clutch control section 36 controls the clutch pressure of the piston 62 in the half-engaged state in accordance with the electric power generation load received by the electric power generation load receiving section 34 and the output rotational frequency N2 of the manual transmission 21 received by the second rotational frequency receiving section 33. Specifically, when the shift signal is output, the clutch control section 36 controls the friction clutch 61 such that the clutch pressure in the half-engaged state increases as the electric power generation load increases. When the shift signal is output, the clutch control section 36 controls the friction clutch 61 such that the clutch pressure in the half-engaged state increases as the output rotational frequency N2 of the manual transmission 21 decreases.

Torque $T_s$ of the sun gear 51 when the friction clutch 61 of the manual transmission 21 is in the disengaged state is calculated by Formula 1 below. Herein, P denotes the load of the electric power generator 23, N2 denotes the output rotational frequency of the manual transmission 21, and L denotes mechanical loss of power transmission from the electric power generator 23 to the manual transmission 21.

$$T_s = P/N2 + L \qquad \text{Formula 1}$$

Then, required torque $T_r$ required to fix the ring gear 52 is calculated by Formula 2 below. Herein, D1 denotes an outer diameter of the sun gear 51, and D2 denotes an outer diameter of the ring gear 52.

$$T_r = T_s \cdot D2/D1 \qquad \text{Formula 2}$$

Then, the clutch control section 36 determines holding torque $T_c$ of holding the ring gear 52 by the friction clutch 61, based on the required torque $T_r$. Specifically, the clutch control section 36 controls pressing force (clutch pressure) of the piston 62 at the time of the shift-down of the manual transmission 21 such that the holding torque $T_c$ satisfies Formula 3 below. Moreover, the clutch control section 36 controls the pressing force (clutch pressure) of the piston 62 at the time of the shift-up of the manual transmission 21 such that the holding torque $T_c$ satisfies Formula 4 below.

$$T_c = T_r - \Delta T \qquad \text{Formula 3}$$

$$T_c = T_r + \Delta T \qquad \text{Formula 4}$$

$\Delta T$ is zero or a positive value and may be a constant value or a variable value. As one example, when maximum torque is represented by $T_{max}$, $\Delta T$ can be determined as in Formula 5 below and is preferably determined as in Formula 6 below.

$$0.001 T_{max} < \Delta T_{max} < 0.5 T \qquad \text{Formula 5}$$

$$0.05 T_{max} < \Delta T_{max} < 0.2 T \qquad \text{Formula 6}$$

It should be noted that when "$T_r > \Delta T$" is satisfied at the time of the shift-down, $T_c$ is zero.

To be specific, in the half-engaged state at the time of the shifting of the manual transmission 21, the piston 62 is controlled to such an extent that the ring gear 52 is not completely fixed by the friction clutch 61. Therefore, as shown in FIG. 7, in the half-engaged state at the time of the shifting, when the load of the electric power generator 23 is constant, the clutch pressure changes in inverse proportion to the output rotational frequency of the manual transmission 21. As a result, the output rotational frequency of the manual transmission 21 is prevented from suddenly changing, and the amount of change of the output rotational frequency of the continuously variable transmission 22 is suppressed.

As above, when switching a speed change position of the manual transmission 21 between the high-speed stage at which the friction clutch 61 is in the engaged state and the low-speed stage at which the friction clutch 61 is in the disengaged state, the friction clutch 61 once becomes the half-engaged state, and then, the speed change is performed. Therefore, the output rotational frequency of the manual transmission 21 can be changed gently. Especially, the continuously variable transmission 22 is located downstream of the manual transmission 21. Therefore, even when the rotational frequency fluctuation range of the power taken out from the aircraft engine 1 is large, the rotational frequency fluctuation range can be narrowed by the combination of the manual transmission 21 and the continuously variable transmission 22, and the rotational frequency input to the electric power generator 23 can be maintained substantially constant. Therefore, in the electric power generating apparatus 13 including the manual transmission 21, momentary rotational frequency fluctuation of the power input to the electric power generator 23 can be prevented, and electric power generation can be stabilized.

REFERENCE SIGNS LIST 1 aircraft engine
13 electric power generating apparatus
21 manual transmission
22 continuously variable transmission
23 electric power generator
28 electric power generation controller
30 continuously variable transmission control section
31 manual transmission control section
32 first rotational frequency receiving section
33 second rotational frequency receiving section
34 electric power generation load receiving section
35 shift command section
36 clutch control section
61 friction clutch
62 piston (actuator)

The invention claimed is:

1. An electric power generation controller for use in an aircraft,
the electric power generation controller being a controller of an electric power generating apparatus including a manual transmission configured to change speed of rotational power of an aircraft engine, transmit the rotational power to an electric power generator, and switch a gear stage by a friction clutch pressed by an actuator,
the electric power generation controller comprising a manual transmission control section configured to control the manual transmission, wherein
the manual transmission control section includes
a shift command section configured to output a shift signal which switches the gear stage of the manual transmission and
a clutch control section configured to, when switching the gear stage of the manual transmission, control clutch pressure of the actuator such that the friction clutch becomes a half-engaged state,
wherein:
the manual transmission control section further includes an electric power generation load receiving section configured to receive an electric power generation load of the electric power generator; and
when the friction clutch is in the half-engaged state, the clutch control section controls the actuator such that clutch pressure of the friction clutch increases as the electric power generation load increases.

2. The electric power generation controller according to claim 1, wherein:
a continuously variable transmission is interposed on a power transmission path between the manual transmission and the electric power generator; and
the electric power generation controller further comprises a continuously variable transmission control section configured to control the continuously variable transmission based on an input rotational frequency of the continuously variable transmission such that the rotational frequency input to the electric power generator becomes constant.

3. The electric power generation controller according to claim 1, wherein:
when the friction clutch is in a first state that is one of an engaged state or a disengaged state, the manual transmission is set to a first gear stage;
when the friction clutch is in a second state that is the other of the engaged state and the disengaged state, the manual transmission is set to a second gear stage;
the shift signal is a shift-down signal which decreases a change gear ratio or a shift-up signal which increases the change gear ratio;
when switching the gear stage of the manual transmission such that the change gear ratio decreases, the clutch control section controls the clutch pressure of the actuator such that the friction clutch becomes the half-engaged state, and then, controls the clutch pressure of the actuator such that the friction clutch becomes the second state; and
when switching the gear stage of the manual transmission such that the change gear ratio increases, the clutch control section controls the clutch pressure of the actuator such that the friction clutch becomes the half-engaged state, and then, controls the clutch pressure of the actuator such that the friction clutch becomes the first state.

4. An electric power generating apparatus for use in an aircraft,
the electric power generating apparatus comprising:
the electric power generation controller according to claim 1;
a manual transmission configured to change speed of rotational power of an aircraft engine and including a plurality of gear stages; and
an electric power generator configured to transmit power which has been changed in speed by the manual transmission.

5. An electric power generation controller for use in an aircraft,
the electric power generation controller being a controller of an electric power generating apparatus including a manual transmission configured to change speed of rotational power of an aircraft engine, transmit the rotational power to an electric power generator, and switch a gear stage by a friction clutch pressed by an actuator,
the electric power generation controller comprising a manual transmission control section configured to control the manual transmission; and a rotational frequency receiving section configured to receive an output-side rotational frequency of the manual transmission, wherein:

the manual transmission control section includes
- a shift command section configured to output a shift signal which switches the gear stage of the manual transmission and
- a clutch control section configured to, when switching the gear stage of the manual transmission, control clutch pressure of the actuator such that the friction clutch becomes a half-engaged state, wherein:

when the friction clutch is in the half-engaged state, the clutch control section controls the actuator such that clutch pressure of the friction clutch increases as the output-side rotational frequency of the manual transmission decreases.

\* \* \* \* \*